United States Patent [19]

Quittkat

[11] 4,353,750
[45] Oct. 12, 1982

[54] METHOD OF FIRING CARBONATE-CONTAINING MINERALS

[75] Inventor: Wolfram Quittkat, Gauting, Fed. Rep. of Germany

[73] Assignee: BKMI Industrieanlagen GmbH, Munich, Fed. Rep. of Germany

[21] Appl. No.: 288,935

[22] Filed: Jul. 31, 1981

[30] Foreign Application Priority Data

Aug. 1, 1980 [DE] Fed. Rep. of Germany ....... 3029210

[51] Int. Cl.$^3$ .............................................. C04B 7/02
[52] U.S. Cl. ...................................... 106/100; 432/14
[58] Field of Search .................... 106/100, 103; 432/14

[56] References Cited

U.S. PATENT DOCUMENTS 4,248,639 2/1981 Quittkat ............................. 106/100
4,288,213 9/1981 Herchenbach et al. ............. 106/100

*Primary Examiner*—James Poer
*Attorney, Agent, or Firm*—Karl F. Ross

[57] ABSTRACT

A method of firing granular carbonate minerals, for example a cement-calcine-forming meal, in which the comminuted solids are preheated in a fluidized bed or by like entrainment in a hot gas and then subjected to decarbonation in a precalcinator before entering a rotary kiln from which the cement clinker is discharged into a cooler for heat exchange between the hot clinker and air. According to the invention, the meal is suspended in the precalcinator, which forms an upright shaft at the inlet end of the kiln, so that the particles do not pass into the kiln directly from the precalcinator but rather can be entrained by the gases in the precalcinator, separated therefrom in a cyclone and delivered to the kiln. Fuel is mixed with the kiln exhaust gases just ahead of the zone at which the meal is suspended so that the sensible heat of the exhaust gas vaporizes the fuel or gasifies the latter. This mixture then contacts the meal and the oxygen-containing gas to ensure uniform heat transfer during oxidation of the gasified product to the meal to be subjected to decarbonation.

4 Claims, 1 Drawing Figure

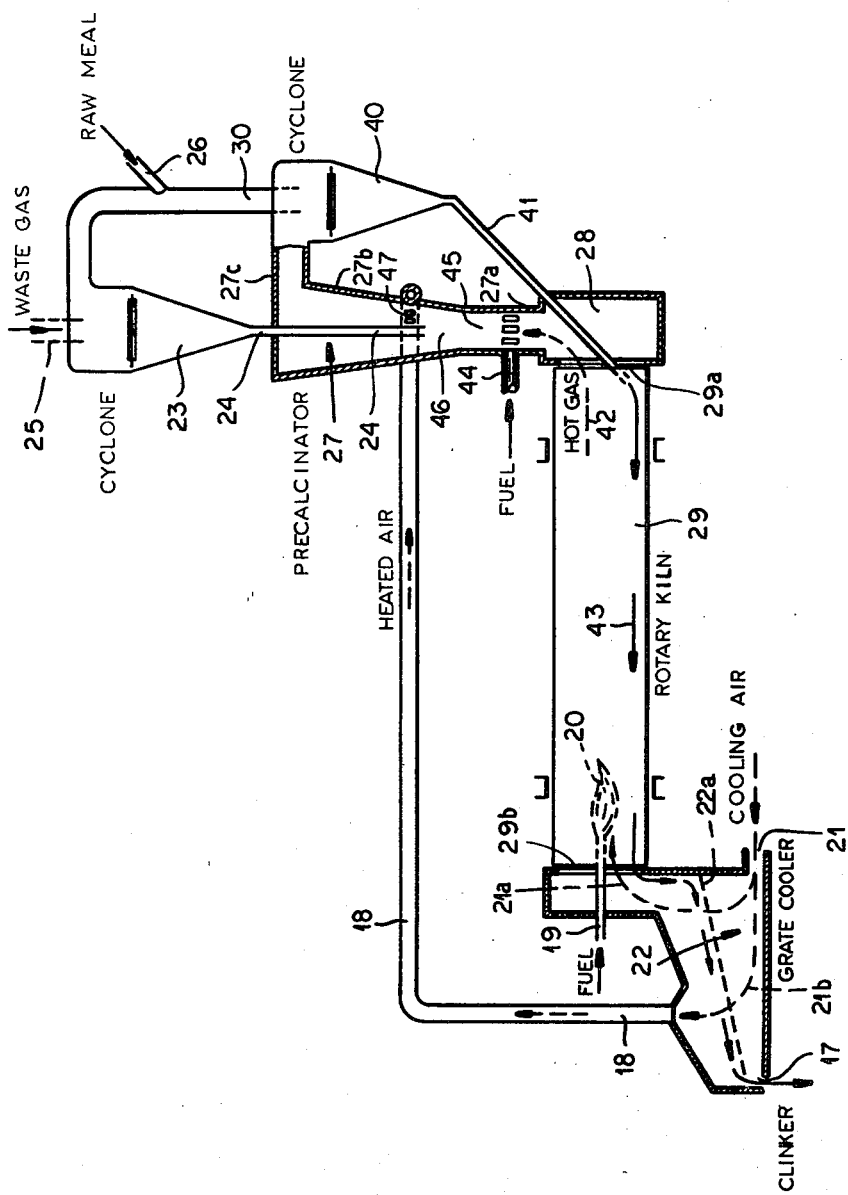

METHOD OF FIRING CARBONATE-CONTAINING MINERALS

FIELD OF THE INVENTION

My present invention relates to a method of firing carbonate-containing comminuted materials or meals, for example, a carbonate mineral meal which can be used for the production of cement clinker. More specifically, the invention relates to the production of cement clinker and improvements in the precalcination or decarbonation of such mineral matter.

BACKGROUND OF THE INVENTION

Carbonate-containing raw materials for the production of calcined or sintered products, e.g. cement clinker, can be subjected to calcination or firing in a rotary kiln, downstream of which is provided a cooler in which the hot cement clinker is contacted by cooling air, the resulting heated air serving elsewhere in the process.

For example, this air can be utilized to preheat the mineral meal, i.e. the crude solid powder, before it is introduced into the rotary kiln.

Fuel is introduced into the system at at least two locations. For example, some fuel may be introduced into the kiln at its solids-outlet end for combustion with some of the preheated air from the cooler, the resulting combustion gases passing from the kiln in counterflow to the solids moving from the inlet end to the outlet end. The major portion of the fuel, however, may be utilized in a precalcination and preheating operation since a substantial portion of the decidification of the raw materials, i.e. removal of carbon dioxide from the carbonates, can be effected in this precalcination stage.

A system of this type is described in my U.S. Pat. No. 4,248,639 and my published European patent document No. 79 100049.0.

Other relevant art includes the publications listed in my U.S. patent and in the German patent document No. 26 29 082 and German patent document No. 25 35 438.

In my European patent document and the aforementioned U.S. patent, I have described a process for the firing of carbonate-containing raw materials for the production of cement clinker, hereinafter referred to as the meal, which comprises a suspension-type preheater for preheating this meal, a precalcinator into which the preheated meal is fed and in which the deacidification reaction is carried out, a rotary kiln receiving the precalcined, deacidified product from the precalcinator and fired to sinter the product to cement clinker, and a cooler receiving the hot clinker and passing the same in direct heat exchange with combustion air.

A portion of this combustion air is used to sustain combustion with a portion of the fuel to fire the rotary kiln and thereby produce hot exhaust gases which travel in counterflow to the solids in the kiln and are discharged through the calcinator which is in the form of an upright shaft at the inlet end of the kiln.

The balance of the combustion air is introduced into this shaft and, in this system, the fuel is sprayed into an exhaust gas/raw meal suspension with the intention of uniformly depositing the fuel particles on the raw meal particles to thereby achieve a direct heat transfer from the fuel to the raw meal particles as the fuel, on these particles, is burned in the heated air.

Experience has shown that, in spite of efforts to obtain as uniform a coating of the fuel on the raw meal particles as possible, concentrations of fuel and locations of reduced fuel density may occur and local heating can result.

This can give rise to localized regions of high temperature levels at which the particles sinter to the walls of the precalcinator or other negative effects on the process.

Such conditions become more pronounced as the time between contact of the fuel with the exhaust gas/raw meal suspension to the beginning of combustion becomes shorter. A gasification of the fuel as is highly desirable for uniform heat transfer, is slowed by the contact of the fuel with the particles and the resulting cooling effect in many cases.

OBJECT OF THE INVENTION

It is, therefore, the principal object of the present invention to provide a process of the type described in and for the purposes of my aforementioned U.S. patent, whereby a more uniform and intensive heat transfer from the fuel to all particles of the raw meal can be achieved without a tendency toward localized overheating and with a minimum tendency of the particles to fuse together or to the walls of the calcinator.

SUMMARY OF THE INVENTION

I have now found, most surprisingly, that it is possible to eliminate local overheating in a process of the type described in the aforementioned U.S. patent wherein the particles of the raw meal are suspended in the precalcinator by a velocity of the exhaust gas from the rotary kiln sufficient to prevent these particles from dropping below a predetermined zone, the exhaust gas being mixed with the fuel upstream of this location in the direction of flow of the exhaust gas so that the sensible heat of the exhaust gas can vaporize (gasify) the fuel and produce with the gasified fuel a combustible mixture which is then contacted with the meal and combustion air, thereby ensuring intensive and uniform heat transfer upon oxidation of the gasified product to the meal to be deacidified.

Thus the fuel is introduced, in the system of the present invention, into the kiln exhaust gas before the resulting mixture meets the suspended particles. According to another feature of the invention, the temperature level and thus the velocity of gasification of the fuel is adjusted by increasing the oxygen content of the furnace exhaust gas by shifting the ratio of the fuel and air introduced at the solids-discharge end of the kiln so that, at the inlet end thereof, oxygen is present to participate in the gasification to raise the temperature level and speed thereof.

Excess temperatures causing the risk of sintering of the mineral product to the walls of the precalcinator can be excluded by reducing the heat value of the fuel.

In the system of the invention, therefore, the fuel is initially gasified in the raw oxygen exhaust gases of the rotary kiln before resulting gasification mixture is contacted and mixed with the crude meal, the reaction with combustion air following thereafter.

When the system of the invention is compared with that of the European patent document or even my aforementioned U.S. patent, it will be apparent that the difference resides in separating the preparation of the exhaust gas/fuel mixture from the contact thereof with the suspended crude meal particles.

Obviously, this arrangement also differs from systems in which the particles are suspended in oxygen-containing gas from the cooler.

In the German patent document No. 26 29 082, mention is made of a gasification of liquid or solid fuels with preheated cooling air serving as the exclusive carrier medium and it is unclear from this disclosure how an equilibrium between combustion and gasification can be achieved. In general, it is difficult with this arrangement to recover fuel decomposition products from the gasification zone and feed these products to the calcination zone for burning in a manner which precludes overheating.

German patent document No. 25 34 438 burns fuel with cooling air substoichiometrically in a separate combustion chamber to achieve gasification, the gasification mixture being combined with the raw meal with air being supplied for complete combustion subsequently.

In the system of the present invention, by contrast, no separate combustion chamber is necessary since the gasification of the fuel can take place in a lower portion of the upright shaft in which the preheated raw meal remains suspended by the high velocity of the furnace exhaust gases, i.e. does not pass downwardly below this predetermined location which lies above the location at which gasification of the fuel occurs exclusively by interaction with the kiln exhaust.

The heat required for the gasification is drawn from the exhaust gas of the kiln which generally is at a much higher temperature than the heated air from the cooler, thereby ensuring a more rapid gasification.

Since the gasification velocity is increased, the volume of the upright shaft can be reduced since additional space is not required for slow gasification. Alternatively, for a given volume of this shaft, the throughput can be increased.

Above the gasification zone, therefore, the carbonate meal to the deacidified is introduced and meets the mixture of rising exhaust gas and gasification products containing kiln dust and solid gasification residues in suspension, the meal being uniformly mixed therewith.

Preferably only then does the combustion air, heated in the cooler, meet the suspension to effect oxidation and, depending upon the degree of mixing and the intensity, a heat transfer to the material to be calcined and deacidified is effected in a uniform manner without localized temperature peaks.

The system thus ensures a homogeneous distribution of the fuel in the carrier gas which, in the case of the present invention, is exclusively the exhaust gas from the rotary kiln, so that uniform gasification can occur as well. The uniformly gasified product then is homogeneously mixed with the meal and additional combustion takes place in this homogeneous mixture whereby a uniform oxidation is ensured.

When a solid fuel is used, e.g. in the form of coal dust entrained in a gas, the exhaust gas from the furnace can be used to blow the coal into the precipitator. Under these conditions, the exhaust gas is cooled increasingly as the heat value of the fuel is reduced, i.e. to the extent that the coal contains a higher proportion of ballast. Thus, if the temperature which might otherwise develop in the precalcinator is excessive and could result in sintering of the mineral product to the wall of the precalcinator of dust to the wall, or in thermal stressing of the lining thereof, I can simply reduce the heat value of the fuel and thereby control the temperature.

This also allows the condensation of alkali chlorides on the cooler fuel particles instead of upon the walls, thereby precluding deposits of this contaminant on the walls and attack thereon by such contaminants.

The gasified mixture is a highly reducing atmosphere and thus, when the final cmbustion occurs, it is found that the level of nitrogen oxides ($NO_x$) in the waste gases is reduced.

Consequently, the system allows ballast-rich or poor-combustibility fuels to be used because the high temperatures of the exhaust gas from the rotary kiln improves the heating and gasification of the fuel and thereby accelerates the gasification by comparison with the earlier techniques.

The temperature in the region of gasification is thus increased. During the heating of the fuel and the gasification, a part of the heat value of the fuel is utilized in a partial oxidation and control of the temperature can be effected by regulating the oxygen content of the kiln exhaust gases.

The invention can also be used for the calcination of other organic meals in which an endothermic decomposition reaction can occur above the gasification temperature of any particular fuel.

BRIEF DESCRIPTION OF THE DRAWING

The above and other objects, features and advantages of the present invention will become more readily apparent from the following description, reference being made to the accompanying drawing in which the sole FIGURE is a diagram in section of an apparatus for carrying out the method of the invention. cl SPECIFIC DESCRIPTION The apparatus shown in the drawing comprises a rotary kiln 29 followed by a grate-type cooler 22 and preceded by the precalcinator 28 formed with an upright shaft.

The raw meal is introduced at 26 in an ascending tube 30 leading from a cyclone 40 to a cyclone 23 so that the raw meal is entrained in the exhaust gas from the process within the tube 30 and is preheated in suspension therein before being separated in this gas in the cyclone 23.

The waste gas is discharged at 25 and may be processed in an electrostatic filter before being released into the atmosphere.

The preheated raw meal particles pass downwardly through a tube 24 into the precalcinator 27 which has a cylindrically constricted portion 27a and a frustoconically diverging upper portion 27b, the latter being formed with a duct 27c opening tangentially into the cyclone 40.

The precalcined product is thus entrained upwardly by the gases in the precalcinator and there separated from these gases in the cyclone 40, the solids passing via the tube 41 into the rotary kiln 29.

In the rotary kiln 29, the deacidified precalcined product is fired and transformed into cement clinker as it passes from the inlet end 29a to the discharge end 29b of the kiln, the hot clinker being then deposited upon the downwardly inclined grate 22a in the grate cooler 22.

At the discharge end 17 of the latter, the cooled clinker is collected for grinding in the production of hydraulic cement. Within the cooler, cooling air introduced at 21 passes through the grate 22a in direct heat exchange with the hot clinker to form preheated air which passes in part through a duct 18 and in part directly into the kiln as represented respectively by the arrows 21*a* and 21*b*.

The air introduced into the kiln is a primary combustion air which supports the combustion of fuel introduced via a pipe 19 to form the flame zone 20 and thereby generate hot gases which pass (arrow 42) in counterflow to the solids (arrow 43) in the kiln.

These hot kiln gases pass through the inlet end 29*a* of the kiln into the furnace head 28 with which the lower end of the precalcinator 27 communicates to form the hot carrier gas for a fuel introduced into the narrowest portion of the precalcinator (via duct 44) so that this narrow portion of the precalcinator forms a gasification zone 45 above which the velocity of the gases is such as to maintain a suspension of the raw meal in a zone or at a location 46.

As described, therefore, the fuel is gasified by the hot kiln gases to form a gasified mixture which then rises to contact the particle suspension which is prevented from passing downwardly by the velocity of these gases into the kiln. The resulting mixture of the meal and the gasified fuel thus is uniform as the gases entrain the particles upwardly into a region 47 at which heated air from duct 18 is introduced to effect combustion of the gasified fuel and the precalcination reaction. The recalcined product is entrained upwardly in the precalcinator in the manner described.

When the example of U.S. Pat. No. 4,248,639 was carried out utilizing the process of the present invention, while the product output parameters remained essentially the same, the danger of localized overheating was excluded in the precalcinator and the useful life of the latter was increased several times. Damage or encrustation of the walls was practically insignificant.

I claim:

1. In a method of calcining a raw meal wherein the raw meal is preheated, the preheated raw meal is deacidified and precalcined in an upright precalcinator at a solids-inlet end of a rotary kiln, the deacidified precalcined meal is calcined in the rotary kiln, the calcined product of the rotary kiln is cooled by air which is thereby heated, hot kiln gases passing upwardly through the precalcinator, a fuel is introduced into the precalcinator and oxidation is effected in the precalcinator with said heated air, the improvement which comprises:

passing the hot kiln gases upwardly through said precalcinator with a velocity sufficient to maintain a suspension of the preheated meal at a location in said precalcinator below which the particles of said meal are prevented from passing, mixing said fuel with said hot kiln gases in a zone spaced below said location, thereby gasifying said fuel in said hot kiln gases with sensible heat thereof producing a gasified mixture, thereafter contacting said gasified mixture with said meal at said location, and oxidizing the gasified mixture with said heated air whereby said meal is precalcined.

2. The improvement defined in claim 1, further comprising the step of controlling the temperature at said location and upon the oxidation of the gasified mixture by lowering the heat value of said fuel to prevent excessive temperatures capable of resulting in encrustation of the walls of said precalcinator.

3. The method defined in claim 1 or claim 2 which comprises controlling the temperature in said zone by adjusting the residual oxygen content of the hot kiln gases entering said zone.

4. The method defined in claim 3 wherein the precalcined meal is entrained upwardly in said precalcinator and is thereafter separated from entraining gases in a cyclone to be delivered to said rotary kiln, the raw meal being introduced into gases rising from said cyclone for entrainment thereby to a further cyclone from which said raw meal is delivered, after being preheated in suspension to said location.

* * * * *